United States Patent [19]

Muellner et al.

[11] 4,426,651
[45] Jan. 17, 1984

[54] STRIP CHART RECORDER

[75] Inventors: William C. Muellner, LaGrange; Walter Hvostik, Berwyn, both of Ill.

[73] Assignee: The Perkin-Elmer Corporation, Norwalk, Conn.

[21] Appl. No.: 354,406

[22] Filed: Mar. 3, 1982

[51] Int. Cl.³ .............................................. G01D 15/24
[52] U.S. Cl. .................................................. 346/136
[58] Field of Search ................ 346/136, 139; 318/603, 318/609

[56] References Cited
U.S. PATENT DOCUMENTS 3,360,799 12/1967 Polster ................................... 346/29
3,806,948 4/1974 Nagao et al. ................ 346/139 D X
4,038,664 7/1977 Muir .................................. 346/136 X Primary Examiner—Donald A. Griffin
Attorney, Agent, or Firm—F. L. Masselle; E. T. Grimes; R. A. Hays

[57] ABSTRACT

An improvement to a chart recorder where the chart paper is driven by a motor responsive to pulses counted by a microprocessor makes it possible for the operator to return the pen at any time to the starting point of the last chart scan by merely pressing a key. Using a programmed counter the microprocessor keeps track constantly of the number of counts since the start of the scan. On key command the microprocessor directs the motor to return through this number of counts plus 50; then to go forward 50 counts thus taking up any backlash in the chart drive so as to return exactly to the initial point of the scan. The subroutine also raises the pen during return and lowers it at the starting point.

3 Claims, 3 Drawing Figures

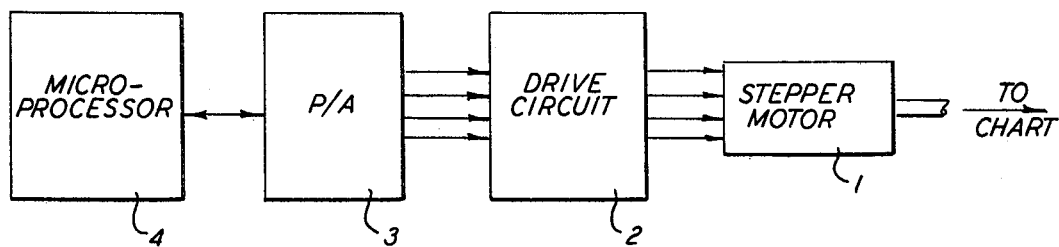

FIG. 1

| 04210 00421 | | | | * | | |
|---|---|---|---|---|---|---|
| 04220 00422 | | | | *AUTO RETURN ROUTINE | | |
| 04230 00423 | | | | * | | |
| 04240 00424P | 0258 | 86 04 | A | ATORTN LOAA | #$04 | DISABLE EXT. IRQ |
| 04250 00425P | 025A | B7 0000 | A | STAA | CRBEKS | |
| 04260 00426P | 025D | BD 02F5 | P | JSR | HDSKOF | DISBLE HANDSHAKE |
| 04270 00427P | 026D | 96 00 | A | LDAA | STATE1 | READ STPMDE FLAG |
| 04280 00428P | 0262 | 84 EF | A | ANDA | #$EF | RESET STPMDE FLAG |
| 04290 00429P | 0264 | 97 00 | A | STAA | STATE1 | IN STATE1..... |
| 04300 00430P | 0266 | 96 00 | A | NORNIT LDAA | SCLSTA | |
| 04310 00431P | 0268 | 8A 80 | A | ORAA | #$80 | CHANGE PENLIFT BIT 1 |
| 04320 00432P | 026A | B7 0000 | A | STAA | OPTDRV | LIFT PEN |
| 04330 00433P | 026D | 97 00 | A | STAA | SCLSTA | SAVE MIRROR BITS. |
| 04340 00434P | 026F | 4F | | CLRA | | |
| 04350 00435P | 0270 | 5F | | CLRB | | |
| 04360 00436P | 0271 | 90 01 | A | SUBA | STPCNT+1 | |
| 04370 00437P | 0273 | D2 00 | A | SBCB | STPCNT | FORM 2'S COMP. OF ST |
| 04380 00438P | 0275 | 80 50 | A | SUBA | #$50 | GO 50 STEPS BEYOND D |
| 04390 00439P | 0277 | C2 00 | A | SBCB | #00 | RETURN POINT |
| 04400 00440P | 0279 | 97 01 | A | STAA | STPWD+1 | |
| 04410 00441P | 027B | D7 00 | A | STAB | STPWD | SAVE IN STEP WORD RE |
| 04420 00442P | 027D | 96 00 | A | LDAA | STATE2 | SET AUTOFLAG |
| 04430 00443P | 027F | BA 20 | A | ORAA | #$20 | |
| 04440 00444P | 0281 | 97 00 | A | STAA | STATE2 | |
| 04450 00445P | 0283 | BD 0000 | A | JSR | CHTSTP | STEP CHART BACK.... |
| 04460 00446P | 0286 | CE 0050 | A | LDX | #$0050 | LOAD STEPS TO GO=50 |
| 04470 00447P | 0289 | DF 00 | A | STX | STPWD | |
| 04480 00448P | 028B | BD 0000 | A | JSR | CHTSTP | TAKE 50 STEPS FWD... |
| 04490 00449P | 028E | 96 00 | A | LDAA | SCLSTA | |
| 04500 00450P | 0290 | 84 7F | A | ANDA | #$7F | PUT PEN DOWN |
| 04510 00451P | 0292 | 97 00 | A | STAA | SCLSTA | |
| 04520 00452P | 0294 | B7 0000 | A | STAA | OPTDRV | |
| 04530 00453P | 0297 | 7E 023E | P | ITNORN JMP | ADVOUT | |

FIG. 3

STRIP CHART RECORDER

RELATED PATENT APPLICATIONS

This application is related to the following three U.S. Patent Applications filed on even date herewith: (1) Ser. No. 354,408, entitled "Variable Gain Amplifier," by William C. Muellner; (2) Ser. No. 354,405, entitled "Pen Drive for Recorder," by Larkin B. Scott and William C. Muellner; and (3) Ser. No. 354,407, entitled "Chart Recorder," by William C. Muellner and Larry E. Plunkett

BACKGROUND OF THE INVENTION

Heretofore strip chart recorders required the operator to set the pen by hand to a desired starting point on the chart for each separate scan, the usual starting point being with the pen on a major grid line of the chart. Despite some attempts to facilitate setting to a major grid line by hardware means such as the provision of special perforations or other indexing means in the chart paper or by indexing devices on the chart drive mechanism, automatic indexing still was hard to set initially, required special paper or was limited to particular chart positions rather than to any major grid line. Such systems provided no simple means of readjustment in the event the chart paper expanded or shrank as a result of humidity changes.

In another patent application, listed as item (2) in the list of related patent applications above, means are disclosed for initialization and subsequent resetting to a major grid line of the chart with the pen through the coaction of a stepper motor drive and a microprocessor enacted software routine. Coacting with the means of this related application it is an objective of the invention herein to provide further means which effect return of the chart to place the pen on the initial chart line of a scan whenever the operator desires.

It is a further objective to effect this automatic return so as to eliminate any error due to backlash in the chart drive.

It is also an objective to have this return available to the operator by the simple action of pressing one key on a keyboard.

BRIEF DESCRIPTION OF THE INVENTION

Strip chart recorders are so well known in the art that little needs to be detailed herein about their general structure and operation. Our invention is concerned with an improvement to the chart paper drive of a recorder which uses a stepper motor or the equivalent to transport the paper chart and which uses a microprocessor to control this transport. The microprocessor may also perform other duties such as are described in detail in the related patent applications previously listed in this application. The foregoing objectives of this improvement and other relationships to the functioning of the recorder of the preferred embodiment are made possible by directing the attention of the microprocessor to a novel subroutine which on operator command coacts with the microprocessor to accomplish the stated objectives.

The normal forward or reverse drive of the chart, which the above operator command interrupts, is effected by loading a counter with a count to be used by a paper drive motor routine. This counter will be decremented by one count at each step of the motor, eventually returning to zero at which time the motor stops until the routine is repeated. The microprocessor controls the above routine. The microprocessor also increments or decrements another counter depending on the direction the paper moves that, once set to zero or initialized at a major grid line, always "knows" the position of the chart relative to the pen. It is noted that the counter could be incorporated in the microprocessor or it could be a separate electrical hardware element.

The microprocessor when using the AUTO RETURN software routine will drive the stepper motor backward to return this counter to zero and then another 50 counts beyond zero, finally returning forward 50 counts to zero. This latter drive beyond and return forward back to zero takes up any backlash or play in the chart drive and constitutes a unique advantage of our invention. This subroutine thus returns the paper exactly to the original major grid line or zero count position of the previous scan as a result of the operator depressing the AUTO RETURN key. The subroutine also raises the pen during chart return and lowers the pen again at the close of the routine.

BRIEF DESCRIPTION OF THE DRAWINGS

The foregoing and other objectives, advantages and features of the present invention are described below in further detail in connection with the drawings which form a part of the disclosure wherein:

FIG. 1 shows a block diagram of the chart drive system;

FIG. 3 shows a typical object code for FIG. 2.

DETAILED DESCRIPTION

Figure 2:
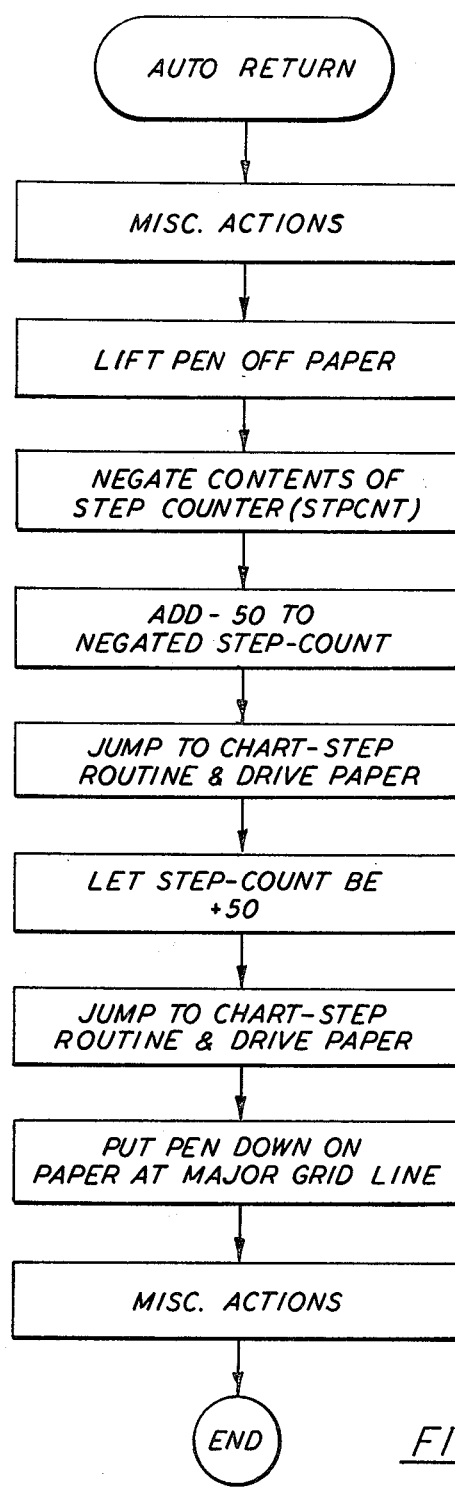
FIG. 2 shows a flow chart of the AUTO RETURN subroutine.

The strip chart paper in the recorder of our exemplary preferred embodiment is driven by conventional sprocket or toothed wheels meshing in holes disposed along both edges of the chart strip. This structure is well known for such recorders. The sprocket wheels are driven by a motor which moves a predetermined angular amount each time an electrical pulse is fed to it by a controlling microprocessor. The sequence of the pulses determines the direction of rotation; the total rotation is determined by the number or count of the pulses. Such a motor may be the type known to the art as a stepper motor.

FIG. 1 shows a simplified block diagram of the motor drive system. The stepper motor 1 drives the chart drive sprockets through a conventional step-down gear train whose gear ratio is chosen so that a given number or count of pulses supplied to the motor will move the chart a desired distance. In the illustrated embodiment this relationship requires 125 counts to move the chart the distance between major grid lines on the chart; however, other count-to-count travel relationships could be a matter of design choice.

The stepper motor is powered by a Darlington switch chip 2 or other suitable drive circuit depending on the power requirements of the stepper motor. This drive circuit in the illustrated embodiment is a solid state chip called ULN2069B made by Sprague, Inc. The switches in the drive circuit 2 are responsive to output signals from a peripheral interface adaptor (PIA) 3 which receives commands from a microprocessor 4. In the illustrated embodiment the PIA is an MC6821 and the microprocessor an MC6802, both made by Motorola, Inc.

Programmed software is associated with the microprocessor to effect the desired chart drive and also other functions associated with the recorder operation but not part of this invention. Detailed explanation of the software operation associated with our invention follows.

Reference to the flow chart, FIG. 2 in conjunction with the object code, FIG. 3, will help to clarify how and the AUTO RETURN subroutine functions. To start this subroutine the operator presses the AUTO RETURN key. The microprocessor first performs certain preliminary miscellaneous actions. These actions include disabling any chart drive input from outside the recorder. Chart drive control is transferred to the subroutine. Next the pen is lifted. The microprocessor then ascertains the chart position in reference to the start of the scan. This position is maintained in the counter (STPCNT) which was set to zero at the start of the scan. During scan STPCNT is advanced one count each time a pulse is delivered to the stepper motor; hence, at all times during the scan the count in STPCNT shows the exact position of the paper chart relative to the position at which the scan started. The subroutine gets this count, converts it to a negative value, and increases this value by 50 counts and places the count into STPWD. The next action is to initiate drive (CHTSTP) of the chart. As the chart drives backward STPWD is decremented one count for each pulse fed to the stepper motor as previously described. When STPWD reaches zero at a chart position 50 counts past the initial scan starting point the microprocessor loads plus 50 counts into STPWD and again goes to CHTSTP to drive the chart forward. This final forward drive takes up any backlash or looseness in the chart movement. The chart thus returns to its initial scan position moving in the same direction, forward, as for the initial scan start. The final step in the routine is to put the pen down and restore the original drive conditions for re-scan.

It will be seen that our invention provides a novel means for return to the start of a scan. This is provided with no demands on the operator other than depressing a key. The precision of restart of the scan is greater than former manual methods of realigning the pen on the chart. The speed of return is far greater. No special perforations of the chart or indexing means on the chart mechanism are required. The subroutine coacts with the microprocessor and stepper motor drive already provided for other recorder functions so no costly extra parts are needed.

Although we have exemplified our invention by a specific preferred embodiment it should be apparent that modifications can be made to either the hardware drive or the software control routine to adapt our invention to other recorder applications without departing from the spirit and scope of the invention as defined in the following claims.

What is claimed is:

1. A strip-chart recorder having means initiated by operator command for returning the strip-chart to the initial starting point of a scan without residual backlash comprising, in combination:
   a pulse drive for driving said strip-chart;
   means for supplying drive pulses to said motor, said means including a microprocessor controlled pulse drive circuit,
   means for counting the number of said drive pulses, said means starting to count from zero when the pen contacting the chart driven by said motor is at an initial starting position; and
   said drive pulse supplying means and said counter means being operative to effect a routine upon operator command, to drive said motor thereby to return said counter to zero count, the final part of said return being driven in the same direction as that of the initial approach to zero.

2. A strip-chart recorder according to claim 1, wherein said operator command is effected by the operator pressing a key.

3. Strip-chart recorder as claimed in claim 1, wherein said routine is programmed to drive said motor until said counter counts a predetermined count past zero before reversing said motor until said count returns to zero whereby backlash is eliminated in the reset of the strip-chart to the initial starting position thereof.

* * * * *